UNITED STATES PATENT OFFICE.

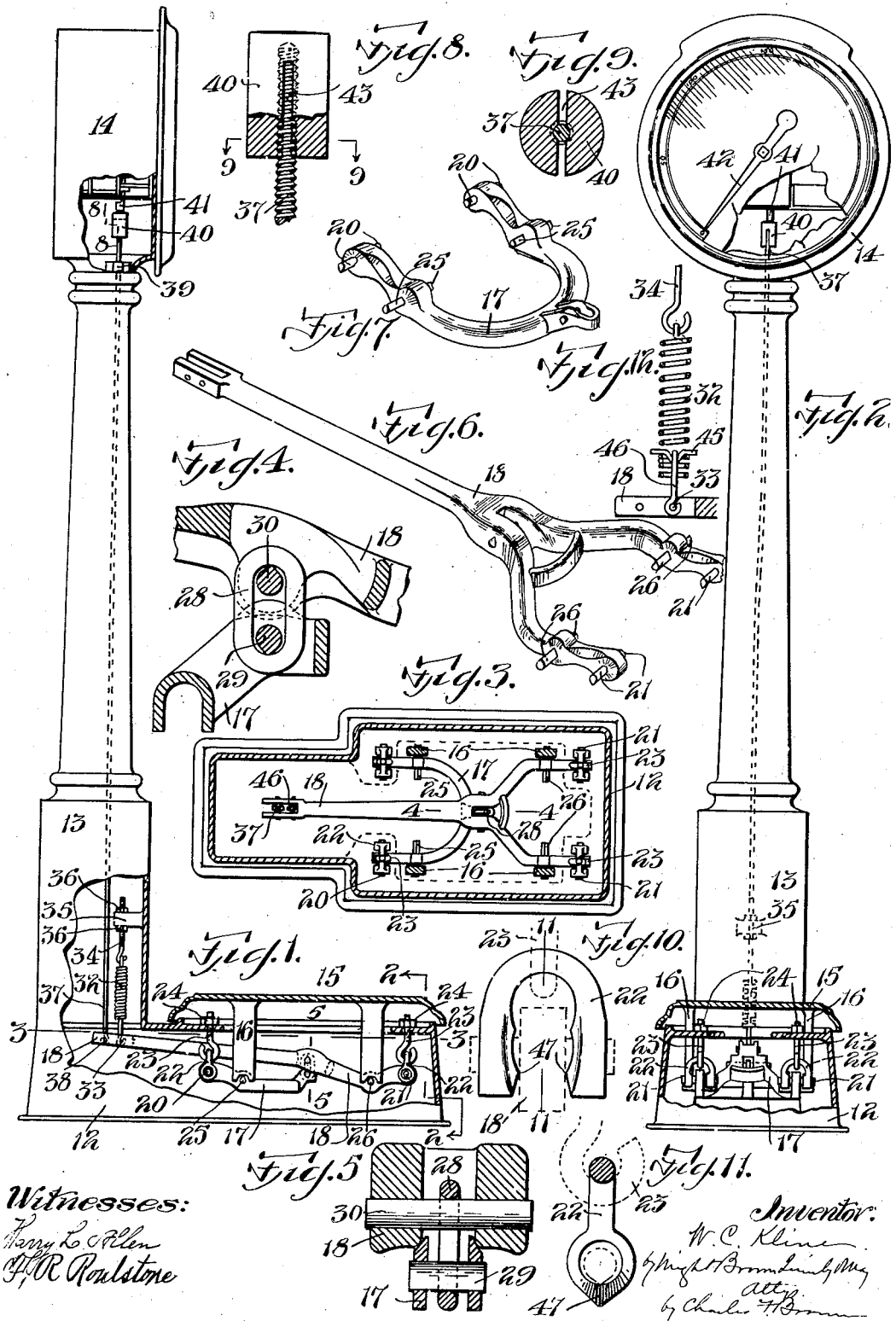

WALLACE C. KLINE, OF BUFFALO, NEW YORK, ASSIGNOR TO CHARLES S. MARSH, OF WINCHESTER, MASSACHUSETTS.

PLATFORM WEIGHING-SCALE.

1,017,154.     Specification of Letters Patent.     Patented Feb. 13, 1912.

Application filed December 27, 1910. Serial No. 599,575.

*To all whom it may concern:*

Be it known that I, WALLACE C. KLINE, of Buffalo, in the county of Erie and State of New York, have invented certain new and useful Improvements in Platform Weighing-Scales, of which the following is a specification.

This invention relates to portable platform scales and particularly to scales forming a part of a coin-controlled weighing machine in which the weight of a person on the scale platform is indicated by a pointer and a dial, the operation of which is permitted by the insertion of a coin. The invention is not limited, however, to coin-controlled weighing machines, and certain features as hereinafter specified, may be used in platform scales in which the scale platform is connected by intermediate mechanism with a scale arm or beam having an adjustable sliding weight.

The invention has for its object (1) to provide certain improvements in the motion-multiplying mechanism which supports the scale platform and through which motion is communicated either to a swinging pointer or to a scale beam, said improvements having for their object a suitable support for the platform permitting the necessary movements of the same, and preventing unnecessary edgewise movements, and also providing for a vertical adjustment of the platform at each of its four corners, so that the platform may be quickly and conveniently adjusted to a level or horizontal position in assembling the parts of the scale. The said improvements, so far as they relate to a coin-controlled scale or weighing machine, have for their object the convenient adjustability of the rod or member which transmits motion from the scale platform to the indicating mechanism, all as hereinafter more fully set forth.

Of the accompanying drawings which form a part of this specification,—Figure 1 represents a side view of a coin-controlled weighing machine embodying my invention, parts being broken away and shown in section; Fig. 2 represents a front elevation of the same and a section on line 2—2 of Fig. 1; Fig. 3 represents a section on line 3—3 of Fig. 1, and a plan view of the parts below said line; Fig. 4 represents a section on line 4—4 of Fig. 3; Fig. 5 represents a section on line 5—5 of Fig. 1; Figs. 6 and 7 represent perspective views of the bifurcated levers hereinafter referred to; Fig. 8 represents a section on line 8—8 of Fig. 1; Fig. 9 represents a section on line 9—9 of Fig. 8; Fig. 10 represents a side view of one of the fulcrum links; Fig. 11 represents a section on line 11—11 of Fig. 10; and Fig. 12 represents a fragmentary sectional view hereinafter referred to.

Similar reference characters indicate the same or similar parts in all the drawings.

In the drawings, 12 represents the hollow base portion of the frame of a weighing machine, and 13 represents a hollow standard rising from one end of the frame and supporting a casing 14 containing suitable coin-controlled indicating mechanism.

15 represents the scale platform which is provided with the usual standards 16, four in number, resting on trunnions carried by the motion-multiplying levers hereinafter described, the platform being movable relatively to the base frame, as usual in platform scales.

The motion-multiplying mechanism includes a primary lever 17 and a secondary lever 18, these levers being compounded in the usual way, and each being of bifurcated form, as shown by Figs. 6 and 7. Each bifurcation of the lever 17 is provided with two oppositely projecting knife-edged trunnions 20, and each bifurcation of the lever 18 is provided with two similar knife-edged trunnions 21. These trunnions are supported by fulcrum links 22, of which there are two pairs, the links of one pair supporting the trunnions 20 while the links of the other pair support the trunnions 21. Each fulcrum link is U shaped, as shown by Fig. 2, and has two bearings in its end portions for the lever trunnions which it supports. The fulcrum links are suspended so that they may swing freely lengthwise of the base frame 12, by hooked rods 23, which engage the neck portions of the fulcrum links and are inserted in orifices formed for their reception in the upper portion of the base frame 12, said rods being screw-threaded and provided with nuts 24 bearing on the base frame. Each hooked rod 23 is therefore adapted to be adjusted vertically independent of the others and supported at any position to which it may be adjusted.

It will be seen by reference to Figs. 1, 2, and 3 that there are four fulcrum links, one for each lever, so that the compounded levers are supported at four points by four supports, each of which is vertically adjustable independently, provision being thus made for adjusting the platform 15 at each of its four corners so that in assembling the parts of the scale the platform may be adjusted to an absolutely level or horizontal position.

The lever 17 is provided with the usual trunnions 25, and the lever 18 with the usual trunnions 26, these trunnions 25 and 26 engaging the lower ends of the platform standards 16 and supporting the platform. The levers 17 and 18 are connected in the usual way by a link 28 engaging knife-edged studs 29 and 30 on the levers 17 and 18.

It will be seen that the fulcrum links 22 arranged in two pairs, one pair engaging each of the levers, each link having two bearings for the corresponding member of trunnions, provide a suitable support for the levers, which permit the necessary movements of the levers in transmitting motion from the platform, and at the same time support the levers firmly so that there is no liability of any edgewise movement or wabbling of the levers, this stability being due to the fact that each fulcrum link has two bearings, and each lever bifurcation two trunnions at opposite sides of the bifurcation. The stable support thus afforded is very desirable in limiting the movements of the scale platform to only those which are necessary to the operation of the scale, any unnecessary edgewise movements of the platform being prevented.

The above described construction is applicable to any platform scale. In a scale or weighing machine of the coin-controlled type illustrated in the drawings, the longer arm of the lever 18 is held yieldingly raised by a spring 32 engaged at one end with a stud 33 on the lever, and on the other end with a hooked rod 34 which is screw-threaded and passes through a fixed ear 35 on the standard 13, said rod being provided with nuts 36 above and below the ear 35, so that it may be adjusted vertically to vary the normal height at which the lever 18 is supported by the spring.

37 represents a rod engaged at one end with the stud 38 on the lever 18 and extending upward through the hollow standard 13 and through a guide 39 at the upper end of said standard. The upper end of the rod 37 is screw-threaded and engaged with an anvil or balance ball 40, which is used for adjusting the scale and also serves as a stop for a plunger 41 forming a part of the coin-controlled mechanism.

The rod 37 and anvil 40 are depressed by the depression of the platform 15, multiplied motion being imparted to the rod through the levers 17 and 18, the anvil when depressed determining the extent of movement of the pointer 42, as fully described in Letters Patent of the United States No. 970,465, dated September 20, 1910.

The anvil 40 is provided with a slot 43 extending from its lower end partly to its upper end and intersecting the screw-threaded socket formed in the anvil for engagement with the screw-threaded portion of the rod 37. The slot 43 enables the sides of the anvil to be pressed inwardly toward each other, so that when the anvil is screwed on to the rod, its sides exert binding pressure on the screw-thread of the rod, said pressure preventing liability of accidental rotation of the anvil. Provision is thus made for accurately adjusting the anvil on the rod and preventing accidental displacement of the anvil.

The tension spring 32 which supports the lever 18 at its normal height, is preferably connected with the lever by an adjustable connection adapted to vary the effective length and therefore the force of the spring, thus affording an additional means of adjusting the normal height of the lever and the rod 37. Said connection includes a stirrup 45 (Fig. 12) having a looped central portion located within the spring, and end portions bearing on a convolution of the spring, and a hooked rod 46 suspended from the stirrup and engaged with the lever stud 33. The stirrup 45 may be engaged with any desired convolution of the spring by turning it relatively to the spring.

Each of the fulcrum links 22 is preferably formed on its inner side with an inwardly projecting beak or protuberance 47 (Figs. 10 and 11). These protuberances are in rubbing contact with the sides of the lever bifurcations interposed between the arms of the fulcrum links, as indicated by dotted lines in Fig. 10. The contact between the protuberances 47 and the side of the lever bifurcations contributes materially to the stability of the support afforded the platform by the motion-multiplying mechanism of which the fulcrum links and the levers form parts, the bearing of the protuberance on the levers serving to prevent friction or minimize lateral movements of the levers.

I claim,—

1. In a platform scale the combination with the base frame, a platform, and motion multiplying levers each provided with spaced apart trunnions, of supporting members secured to the base frame, and fulcrum links depending from said supporting members and receiving the trunnions of the respective levers, said fulcrum links being provided with means for preventing lateral movement of said levers, each of said supporting members being vertically adjustable independently of the others to correspondingly and independently adjust that portion of the respective levers supported thereby, whereby said platform may be accurately leveled.

2. In a platform scale the combination with a base frame, a platform, and motion multiplying levers each provided with spaced apart trunnions, of supporting members each comprising a screw threaded rod passed through orifices in the base frame and provided with a hook end, fulcrum links suspended from the hook ends of said supporting members and receiving the trunnions of the respective levers, said fulcrum links being provided with means for preventing lateral movement of said levers, and a nut engaging the threaded rod of each supporting member and bearing upon said base frame to vertically adjust each supporting member independently of the others to correspondingly and independently adjust that portion of the respective levers supported thereby, whereby said platform may be accurately leveled.

3. In a platform scale the combination with the base frame, the platform and the bifurcated motion-multiplying levers supporting the platform, each lever bifurcation having two oppositely projecting trunnions, of U-shaped fulcrum links bestriding the lever bifurcations and each having two trunnion bearings, said fulcrum links being provided with means for supporting the levers against lateral tipping and swinging movements, and supporting members engaged with the base frame and with the fulcrum links, each of said supporting members being vertically adjustable independently to vertically adjust the lever bifurcation supported thereby independently of the other bifurcation of the same lever, and thereby vertically adjust the corresponding portion of the platform, whereby the latter may be accurately leveled.

4. In a platform scale the combination with the base frame, the hollow standard thereon, the platform, and the motion-multiplying mechanism supporting the platform, said mechanism including the secondary lever located under the platform and projecting under the hollow standard, of a rod engaged with said lever and extending upwardly through the standard, an anvil adjustably connected to the upper end of said rod and provided with means for exerting a binding pressure upon said rod, and a tension spring supported by the standard and engaged with the lever to yieldingly support the latter, and means for adjusting said spring to determine the normal height of the levers, rod and anvil.

5. In a platform scale the combination with the base frame, the hollow standard thereon, the platform, and the motion-multiplying mechanism supporting the platform, said mechanism including the secondary lever located under the platform and projecting under the hollow standard, of a rod engaged with said lever and extending upwardly through the standard, an anvil adjustably connected to the upper end of said rod and provided with means for exerting a binding pressure upon said rod, the standard being provided with an inwardly projecting ear, a rod vertically adjustable in said ear and provided with locking means whereby it may be secured at any desired adjustment and a tension spring supported by said rod and engaged with the lever to yieldingly support the latter.

6. In a platform scale the combination with the base frame, the hollow standard thereon, the platform, and the motion-multiplying mechanism supporting the platform, said mechanism including the secondary lever located under the platform and projecting under the hollow standard, of a rod engaged with said lever and extending upwardly through the standard, an anvil adjustably connected to the upper end of said rod and provided with means for exerting a binding pressure upon said rod, the standard being provided with an inwardly projecting ear, a rod vertically adjustable in said ear and provided with locking means whereby it may be secured at any desired adjustment, a stirrup adjustably engaging the convolutions of said spring adjacent the lower end thereof, and a supporting member for said lever depending from said stirrup, the upper end of said spring being connected with said vertically adjustable rod.

7. In a platform scale the combination with the base frame, the hollow standard thereon, the platform, and the motion-multiplying mechanism supporting the platform, said mechanism including the secondary lever located under the platform and projecting under the hollow standard, of a rod engaged with said lever and extending upwardly through the standard, an anvil carried by the upper end of said rod, and a tension spring supported by the standard and engaged with the lever to yieldingly support the latter, the rod being screwthreaded at its upper end and the anvil provided with a threaded socket and with a slot dividing said socket and permitting its divisions to bind on the rod.

In testimony whereof I have affixed my signature, in presence of two witnesses.

WALLACE C. KLINE.

Witnesses:
WILLIAM SCHRAMM,
CHAS. B. HUCK.